J. CLAUDE.
STIRRING DEVICE FOR MECHANICAL ROASTING FURNACES.
APPLICATION FILED APR. 16, 1915.
1,187,504.
Patented June 20, 1916.
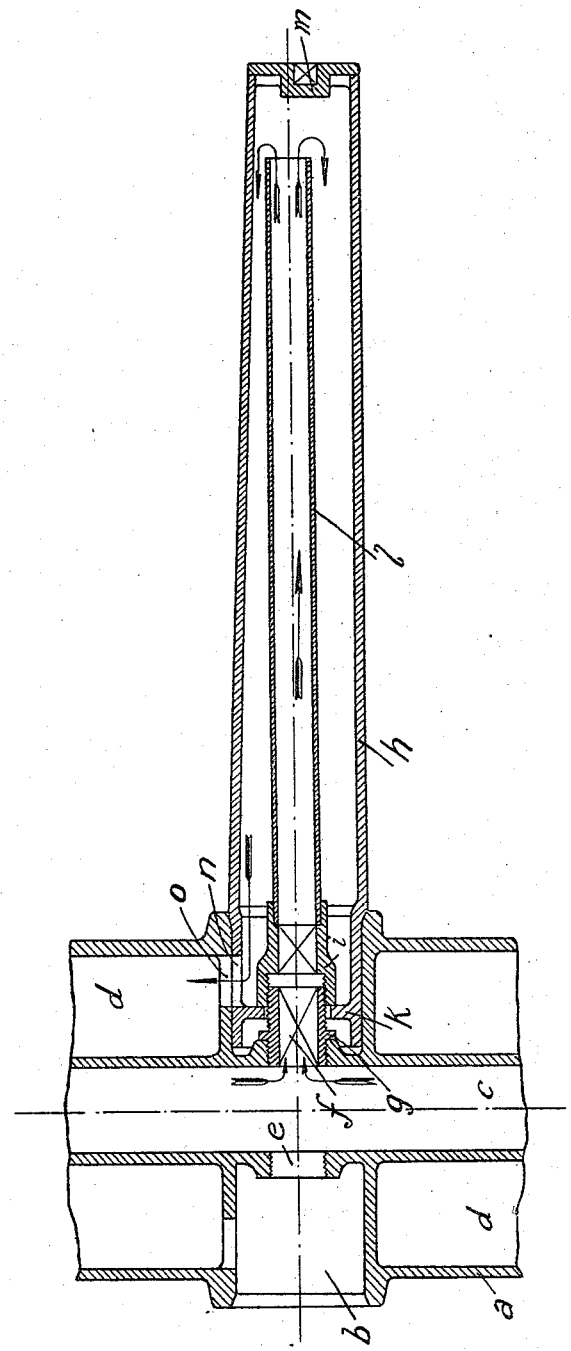
Inventor:
Josef Claude

UNITED STATES PATENT OFFICE.

JOSEF CLAUDE, OF FRANKFORT-ON-THE-MAIN, GERMANY, ASSIGNOR TO METALL-BANK UND METALLURGISCHE GESELLSCHAFT A. G., OF FRANKFORT-ON-THE-MAIN, GERMANY, A CORPORATION.

STIRRING DEVICE FOR MECHANICAL ROASTING-FURNACES.

1,187,504.

Specification of Letters Patent.

Patented June 20, 1916.

Application filed April 16, 1915. Serial No. 21,932.

*To all whom it may concern:*

Be it known that I, JOSEF CLAUDE, metallurgical engineer, a subject of the Emperor of Germany, and residing at Frankfort-on-the Main, Germany, have invented certain new and useful Improvements in Stirring Devices for Mechanical Roasting-Furnaces, of which the following is a specification.

The invention relates to improved means for fastening the rabble arms on the shaft of mechanical furnaces for roasting or otherwise treating ores and other material. In this new fastening device the parts serving for the fastening of the rabble arms are located within the cooled shaft or the cooled hollow arm body, so as to guard them from the heat as well as the chemical action of the material under treatment and the roasting gases. This will have for effect to secure greater consistency of the connecting members and in case of rupture of the arm prevent them from being distorted, and to enable easy and quick removal of said connection members and the arm body from the shaft. Said connection members are of hollow shape and of such dimensions that they can be traversed themselves by the cooling medium, and to render them resistant and of easy access.

The invention is shown in the drawing given by way of example.

$a$ is a part of the shaft, in section, with cylindrical recesses $b$ for receiving the ends of the rabble arms. The shaft is provided with a central channel $c$, and channels $d$ separated therefrom. At the rear end of the recess $b$ there is in the shaft a circular perforation $e$ which is threaded at the inside. A hollow bolt $f$ is screwed into this perforation $e$, the hollowing being of angular section so that the bolt may be turned by means of a key. It bears with its tie $g$ against an abutment of the shaft-wall. Also the front end of the hollow bolt is threaded at the outside. Into the cylindrical recess $b$ of the shaft the end of the rabble arm $h$ is inserted about the hollow bolt. Through the front open end of the rabble arm a hollow square nut $i$ is introduced and tightened upon the bolt $f$. With its rear end the nut-screw $i$ bears against the annular projection $k$ inside the rabble arm, thus pressing, when the screw is tightened, the rabble arm into its seat. A pipe $l$ is inserted into the hollow front end of the nut and the front end of the rabble arm is closed by means of a cover $m$.

The rabble arm is cooled for instance by means of air, which is admitted, together for the several arms, to the central channel $c$ of the shaft, from which it passes through the hollow bolt $f$ and the hollow nut $i$ to the pipe. From pipe $l$ the air flows to the interior of the rabble arm from which it escapes through the opening $n$ which is in communication with a corresponding opening $o$ in the wall of the recess in the shaft. Through this opening the air is introduced to the channels $d$ of the shaft and escapes at the bottom or the top.

The advantage of the arrangement as described is, on the one hand, its simplicity, as cumbersome casting-molds can be dispensed with; on the other hand, the amplitude of the screwed parts allows easier access and hence repair in case of rupture of the arms. When an arm is broken, the pipe $l$ is removed, the nut $i$ screwed off and the end of the rabble arm pulled out. Should this be difficult, then the hollow bolt $f$ is screwed off, the tie $g$ of which in being loosened is pressing against the annular flange $k$ of the rabble arm, thus forcing out the end sticking fast.

What I claim is:

In a stirring device for mechanical roasting furnaces for ores and other material, a shaft with recesses for the rabble arms, a hollow rabble arm, one of the ends of which is shaped so as to fit in a recess of the shaft, a hollow bolt, fastened in the rear wall of the shaft-recess, the interior of the bolt being in communication with a central channel of the shaft, a hollow nut which is open at the front and which is screwed upon the front end of the hollow bolt, thus pressing against an abutment in the interior of the hollow rabble arm, and pressing it against its seat in the shaft, a cooling pipe fitting in the hollow nut, so as to enable the cooling medium to pass from the shaft through the hollow bolt, the hollow nut and the cooling pipe into the inside of the rabble arm.

In testimony whereof I affix my signature in presence of two witnesses.

JOSEF CLAUDE.

Witnesses:
 JEAN GRUND,
 CARL GRUND.

Copies of this patent may be obtained for five cents each, by addressing the "Commissioner of Patents, Washington, D. C."